(12) United States Patent
Zakaria et al.

(10) Patent No.: US 10,930,122 B1
(45) Date of Patent: Feb. 23, 2021

(54) METHODS AND APPARATUS FOR DETECTING FAULTS IN A SIREN-BASED ALERT SYSTEM

(71) Applicant: Motorola Solutions, Inc., Chicago, IL (US)

(72) Inventors: Oren Zakaria, Raanana (IL); Nissim Gean, Netanya (IL); Jacob Shem Tov, Jerusalem (IL); Irakliy Papiashvily, Ashkelon (IL); Alexander Becker, Ariel (IL); Lionid Kodner, Modi'in (IL); Iftach Sharabi, Tel Aviv (IL); Ran Pery, Reshon Letzion (IL); Haim Kahlon, Shoam (IL)

(73) Assignee: Motorola Solutions, Inc., Chicago, TX (US)

( * ) Notice: Subject to any disclaimer, the term of this patent is extended or adjusted under 35 U.S.C. 154(b) by 0 days.

(21) Appl. No.: 16/567,685

(22) Filed: Sep. 11, 2019

(51) Int. Cl.
| G08B 3/10 | (2006.01) |
| G08B 29/02 | (2006.01) |
| G06F 9/54 | (2006.01) |
| G08B 25/00 | (2006.01) |
| G08B 27/00 | (2006.01) |
| G08B 29/18 | (2006.01) |

(52) U.S. Cl.
CPC .............. *G08B 3/10* (2013.01); *G06F 9/542* (2013.01); *G08B 25/001* (2013.01); *G08B 27/005* (2013.01); *G08B 29/02* (2013.01); *G08B 29/185* (2013.01)

(58) Field of Classification Search
CPC combination set(s) only.
See application file for complete search history.

(56) References Cited

U.S. PATENT DOCUMENTS

2007/0146127 A1* 6/2007 Stilp .................. G08B 1/08
340/531

* cited by examiner

*Primary Examiner* — Thomas S McCormack
(74) *Attorney, Agent, or Firm* — Baker Botts L.L.P.

(57) ABSTRACT

Methods for detecting faults in a siren-based alert system include receiving, by a siren device from a central siren controller, an activation command. The activation command identifies a neighbor siren device that is to be activated. Audible alerts output by the neighbor siren device include a unique identifying characteristic associated with the neighbor siren device. The method includes determining that the unique identifying characteristic is not detectable by the siren device and, in response, taking corrective action. The corrective action includes the siren device sending a siren fault notification to the central siren controller indicating a failure to detect the unique identifying characteristic and may also include modifying the audible alert output by the siren device to compensate for the faulty siren device. The siren device may send a siren fault notification to the central siren controller if an unexpected audible alert, such as a potential false alarm, is detected.

20 Claims, 5 Drawing Sheets

METHODS AND APPARATUS FOR DETECTING FAULTS IN A SIREN-BASED ALERT SYSTEM

BACKGROUND OF THE INVENTION

Public safety organizations may operate siren-based systems to alert the public in the event of a severe weather event, a natural disaster, or another public safety emergency. For example, some cities and municipalities deploy multiple distributed sirens that can sound tornado warnings or other audible alerts in response to receiving a signal representing an activation command from a central location. Each siren may cover a specific geographic area within the city or municipality. In some existing siren-based systems, it is not possible to determine whether all the sirens sounded their warnings in response to a command to do so. In some existing alert systems, activation commands are broadcast to multiple sirens from a central location, but there is no feedback mechanism to determine the status of the sirens at the central location following the broadcast of an activation command. Therefore, if one of the sirens malfunctions, or if a communication channel between the central location and one of the sirens is disrupted, the fault may go undetected, and thus uncorrected, leading to a lack of coverage in the alert system during an emergency.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for detecting faults in a siren-based alert system. In one embodiment, a disclosed method for detecting a fault in a siren-based alert system includes receiving, by a first one of multiple siren devices in the siren-based alert system from a central siren controller, a first activation command. The first activation command includes an indication that a second one of the siren devices is to be activated. An audible alert from the second siren device includes a first unique identifying characteristic associated with the second siren device. The method also includes determining, at the first siren device subsequent to receiving the first activation command, that the first unique identifying characteristic is not detectable by the first siren device and, in response to determining that the first unique identifying characteristic is not detectable by the first siren device, taking corrective action in the siren-based alert system. The corrective action includes the first siren device sending a first siren fault notification to the central siren controller indicating a failure to detect, at the first siren device, the first unique identifying characteristic.

In various embodiments, the first activation command may include information identifying a subset of the multiple siren devices to be activated, the subset including the second siren device. The first activation command may further include information specifying a respective unique identifying characteristic associated with each of the siren devices in the identified subset of siren devices to be activated, the information including the first unique identifying characteristic. The identified subset of siren devices to be activated may further include the first siren device and the method may further include generating, at the first siren device, an audible alert including a second unique identifying characteristic associated with the first siren device.

The method may include storing, at the first siren device prior to receiving the first activation command, information identifying the second siren device as a siren device at a geographic distance from the first siren device in a range of geographic distances within which audible alerts generated by the second siren device are detectable by the first siren device. The method may also include storing, at the first siren device prior to receiving the first activation command, information identifying the first siren device, the second siren device, and a third siren device as siren devices in a predefined subset of the multiple siren devices to be activated together as a siren activation group, detecting, at the first siren device subsequent to cancellation of the first activation command and absent receipt of a second activation command directed to the siren activation group, a second unique identifying characteristic associated with the third siren device, and performing, by the first siren device in response to detecting the second unique identifying characteristic, sending a second siren fault notification to the central siren controller indicating that the second unique identifying characteristic was detected by the first siren device absent receipt of a second activation command directed to the siren activation group or generating an audible alert including a third unique identifying characteristic associated with the first siren device.

In various embodiments, the first siren device, the second siren device, and a third siren device may be siren devices in a predefined subset of the multiple siren devices to be activated together as a siren activation group. The method may further include detecting, at the third siren device subsequent to receiving the first activation command, the first unique identifying characteristic and determining, at the central siren controller in response to a failure to receive a siren fault notification from the third siren device indicating a failure to detect the first unique identifying characteristic in sounds audible by the third siren device, that further corrective action is unnecessary. In various embodiments, the multiple siren devices in the siren-based alert system are to be activated by the first activation command, the first activation command may be broadcast by the central siren controller one or more times, and the method may further include, subsequent to broadcasting the first activation command a predetermined number of times, interrogating, by the central siren controller, each of the siren devices in turn to determine whether the siren device received the first activation command.

In one embodiment, a disclosed siren device for a siren-based alert system includes an interface through which the siren device receives a first activation command from a central siren controller. The first activation command includes an indication that a first additional siren device in the siren-based alert system is to be activated. An audible alert from the first additional siren device includes a first unique identifying characteristic associated with the first additional siren device. The siren device also includes a microphone configured to receive audio signals and a local siren controller. The local siren controller includes a processor and a memory storing program instructions that when executed by the processor cause the processor to perform determining, subsequent to receiving the first activation command, that the first unique identifying characteristic is not detectable in audio signals received by the microphone and, in response to determining that the first unique identifying characteristic is not detectable in audio signals received by the microphone, taking corrective action in the siren-based alert system. Taking the corrective action includes causing a first siren fault notification to be sent to the central siren controller via the interface indicating a failure to detect the first unique identifying characteristic.

In various embodiments, the identified collection of siren devices may also include the siren device. The siren device may further include alert generation circuitry and a speaker configured to output audible alerts. When executed by the processor, the program instructions further cause the processor to initiate generation, by the alert generation circuitry, of an audible alert including a second unique identifying characteristic associated with the siren device and to cause the generated audible alert including the second unique identifying characteristic to be output by the speaker. The first activation command may include information identifying a collection of siren devices in the siren-based alert system to be activated, the identified collection including the first additional siren device and information specifying a respective unique identifying characteristic associated with each of the siren devices in the identified collection of siren devices, the information including the first unique identifying characteristic. When executed by the processor, the program instructions may further cause the processor to perform storing the information identifying a collection of siren devices and the information specifying a respective unique identifying characteristic associated with each of the siren devices in the identified collection of siren devices in the memory.

In one embodiment, a disclosed siren-based alert system includes a central siren controller and multiple siren devices. A first one of the siren devices includes an interface through which the first siren device receives a first activation command from the central siren controller. The first activation command includes an indication that a second one of the siren devices is to be activated. An audible alert from the second siren device includes a first unique identifying characteristic associated with the second siren device. The first siren device also includes a microphone configured to receive audio signals and a local siren controller. The local siren controller includes a local processor and a locally-accessible memory storing program instructions that when executed by the local processor cause the local processor to perform determining, subsequent to receiving the first activation command, that the first unique identifying characteristic is not detectable in audio signals received by the microphone and, in response to determining that the first unique identifying characteristic is not detectable in audio signals received by the microphone, taking corrective action in the siren-based alert system. Taking the corrective action includes causing a first siren fault notification to be sent to the central siren controller via the interface indicating a failure to detect the first unique identifying characteristic.

In any of the disclosed embodiments, the first unique identifying characteristic associated with the second siren device may include data encoded in the audible alert from the second siren device, data transmitted using a sideband modulation of the audible alert from the second siren device, a pitch of the audible alert from the second siren device, or a period of the audible alert from the second siren device. The corrective action may include modifying an audible alert generated by the first siren device to compensate for a failure of the second siren device to generate an audible alert. Modifying the audible alert may include changing a position, orientation, or panning motion of the first siren device, or increasing a volume of the audible alert generated by the first siren device.

In various embodiments, when executed by the local processor, the program instructions may further cause the local processor to perform storing, at the first siren device prior to receiving the first activation command, information identifying the first siren device, the second siren device, and a third siren device as siren devices in a predefined subset of siren devices to be activated together as a siren activation group, detecting, subsequent to cancellation of the first activation command and absent receipt of a second activation command directed to the siren activation group, a second unique identifying characteristic associated with the third siren device, and sending, in response to detecting the second unique identifying characteristic, a second siren fault notification to the central siren controller indicating that the second unique identifying characteristic was detected by the first siren device absent receipt of a second activation command directed to the siren activation group.

In various embodiments, the central siren controller may include a transceiver configured to broadcast one or more activation commands including the first activation command to the multiple siren devices and to receive the first siren fault notification and the second siren fault notification. The central siren controller may also include a central processor and a controller memory storing program instructions that when executed by the central processor cause the central processor to perform receiving the second siren fault notification, determining whether an audible alert output by the third siren device represents a false alarm, broadcasting, in response to a determination that the audible alert output by the third siren device represents a false alarm, a cancellation command including an indication that the audible alert output by the third siren device is to be cancelled, and broadcasting, in response to a determination that the audible alert output by the third siren device does not represent a false alarm, a third activation command including an indication that the first siren device is to be activated. When executed by the local processor, the program instructions stored in the locally-accessible memory of the first siren device may further cause the local processor to refrain from generating an audible alert in response to receiving the cancellation command, and to generate an audible alert including a third unique identifying characteristic associated with the first siren device in response to receiving the third activation command.

In some embodiments, in the event of an emergency, a dispatcher in a public safety organization may be apprised of the emergency, for example, by receiving a phone call from an observer, or by receiving a notification from a weather service, a military or governmental organization, or another public safety organization. In response to being apprised of the emergency, the dispatcher may initiate the activation of a siren-based alert system to alert the public. In some embodiments, the activation of a siren-based alert system may be initiated automatically for certain types of emergencies, such as in response to receiving an automated emergency signal from public safety systems operated by a weather service, a military or governmental organization, or another public safety organization.

As noted above, in some existing siren-based alert systems, activation commands are broadcast to multiple distributed sirens from a central location, but there is no feedback mechanism to determine the status of the sirens at the central location following the broadcast of an activation command. Therefore, if one of the sirens malfunctions, or if a communication channel between the central location and one of the sirens is disrupted, the fault may go undetected, and thus uncorrected, leading to a lack of coverage in the alert system during an emergency.

In some embodiments, a siren-based alert system may include a central siren controller that communicates with multiple distributed siren devices by broadcasting commands over a communication channel with very limited bandwidth, from a data communications point of view, and very high latency. In some embodiments, in order to attempt to determine the status of each siren device after broadcasting a particular activation command one or more times over such a communication channel, the central siren controller may begin interrogating each individual siren device, one at a time, over the communication channel. However, due to the limitations of the communication channel in terms of transmission bandwidth and latency, it might not be possible to receive timely feedback from the siren devices when interrogating, and then waiting for an acknowledgement from, each siren device in turn. In at least some embodiments, the techniques described herein for detecting faults in a siren-based alert system may allow faults in the siren-based alert system to be detected far more quickly than they could be detected using such an interrogation. In the disclosed siren-based alert systems, corrective action can be taken much more quickly in response to a siren fault than in systems that include no mechanisms for receiving feedback from the siren devices in the system or in systems that rely solely on interrogation as a mechanism for receiving feedback from the siren devices in the system.

In at least some embodiments, the siren-based alert systems described herein may rely on individual siren devices to determine whether or not nearby siren devices that should have been activated by a given activation command have actually generated and output a suitable audible alert. As described in more detail below, in order to determine which siren devices have generated their audible alerts and which have not, each siren device may modulate the audible alert that it generates to include a unique identifying characteristic that can be detected by other siren devices that are close enough to "hear" the audible alert. If a given siren device is not able to detect the unique identifying characteristic of one of its neighbors that should have been activated by a received activation command, the given siren device may take corrective action by, for example, sending a siren fault notification to the central siren controller and, in some cases, modifying its own audible alert to compensate for the failure of its neighbor. Because information may only be sent from individual siren devices to the central siren control when they are reporting a faulty siren, the network capacity required for the siren-based alert system may be reduced. In some embodiments, to reduce the probability of incorrectly reacting to a false alarm, the central siren controller may declare a siren device as faulty only if at least two of its neighbors report the same siren fault.

Figure 1:
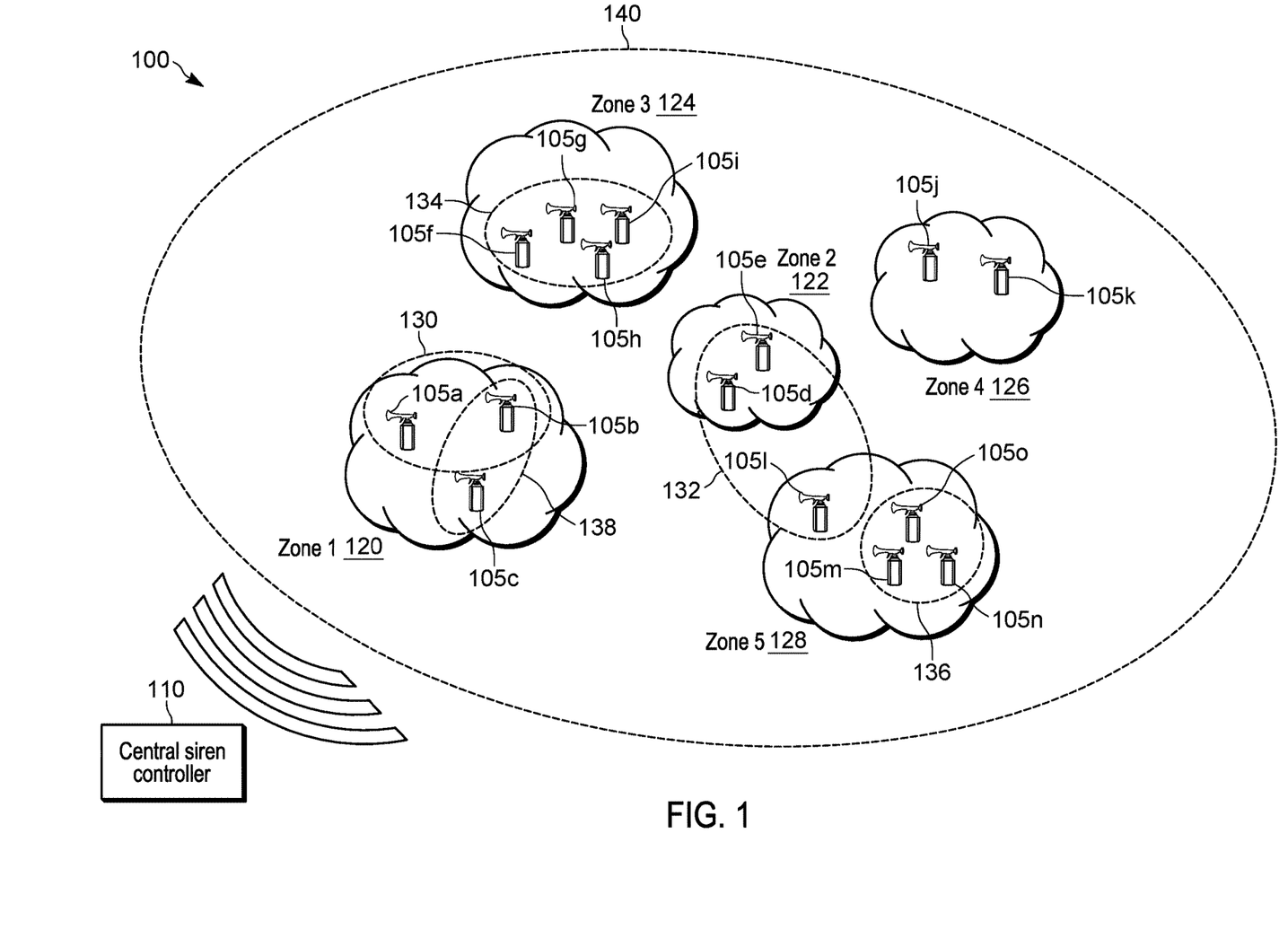
FIG. 1 is a block diagram illustrating selected elements of an example siren-based alert system, in accordance with some embodiments.

Referring now to FIG. 1, there is provided a block diagram illustrating selected elements of a siren-based alert system 100, in accordance with some embodiments. In the illustrated example, siren-based alert system 100 includes a central siren controller 110 and a plurality of siren devices 105 located in various geographic zones. Each given siren device in a geographic zone may be at a geographic distance from each of the other siren devices in the geographic zone in a range of geographic distances within which audible alerts generated by the other siren devices are detectable by the given siren device. In at least some embodiments, the central siren controller 110 may be configured to broadcast activation commands over a communications network (not shown in FIG. 1) to activate particular siren devices 105, in response to which each of the particular siren devices 105 that receives the activation command may generate and output an audible alert. In various embodiments, the communications network may, for example, be a fourth-generation broadband wireless technology (4G) network, a land mobile radio (LMR) network, a long-term evolution wireless technology (LTE) network, a Wi-Fi network, a fifth-generation broadband wireless technology (5G) network, or any other suitable communications network. In some public safety applications, the communications network may be a high-powered land mobile radio (LMR) network or a public safety long-term evolution (PS LTE) network. In at least some embodiments, subsequent to broadcasting an activation command a predetermined number of times (for example, three times), the central siren controller 110 may begin interrogating each of the siren devices targeted by the activation command in turn to determine whether the siren device received the activation command. However, the techniques described herein for detecting faults in a siren-based alert system may allow faults in the siren-based alert system 100 to be detected far more quickly than they could be detected using such an interrogation.

In some cases, it may be useful for a public safety organization, after recognizing that an emergency exists, to activate all or a portion of a siren-based alert system to alert the public to the emergency. In some cases, it may be desirable to alert only those in danger due to the emergency. Accordingly, an alert may be targeted to only a subset of the siren devices in the siren-based alert system. As described in more detailed herein, an activation command may include information identifying a subset of the siren devices 105 to be activated in response to an emergency, such as a severe weather event, a natural disaster, or another public safety emergency. The subset of siren devices 105 may be identified by geographic zone, by siren activation group, or on an individual siren device basis, in various embodiments. In some embodiments, an activation command may also include information specifying a respective unique identifying characteristic associated with each of the siren devices 105 in the identified subset of siren devices 105 to be activated.

In the illustrated example, siren devices 105a, 105b, and 105c are located in geographic zone 1 (120), siren devices 105d and 105e are located in geographic zone 2 (122), siren devices 105f, 105g, 105h, and 105i are located in geographic zone 3 (124), siren devices 105j and 105k are located in geographic zone 4 (126), and siren devices 105l, 105m, 105n, and 105o are located in geographic zone 5 (128). In at least some embodiments, siren devices 105 located in the same geographic zone may, based on their relative locations, the topography of the geographic zone, and/or other factors, be able to receive and identify the sources of the audible alerts output by the other siren devices 105 in the geographic zone. For example, each siren device 105 that generates and outputs an audible alert may modulate its alert to include a unique identifying characteristic and the other siren devices 105 in the same geographic zone may be able to determine, based on the unique identifying characteristics included in each of the audible alerts they receive, the particular siren devices 105 from which each audible alert was output.

As noted above, in at least some embodiments, an activation command may include information indicating that the members of a siren activation group should be activated. For example, in siren-based alert system 100 illustrated in FIG. 1, various predefined subsets of siren devices 105 are shown within ellipses outlined by dashed lines. Each of these ellipses may represent a siren activation group containing a predefined subset of the siren devices 105 that are to be activated together as a group. Note that some siren activation groups may include only a single siren device 105. In some embodiments, one or more siren devices, such as siren devices 105j and 105k shown in FIG. 1, might not be included in any siren activation groups, but may be identified individually in an activation command when targeted for activation.

In the illustrated embodiment, at least some of the siren activation groups may include siren devices 105 located in more than one geographic zone. In addition, at least some of the siren devices 105 may be members of more than one siren activation group. For example in the embodiment illustrated in FIG. 1, siren devices 105a and 105b in geographic zone 1 (120) are members of siren activation group 130, siren devices 105d and 105e in geographic zone 2 (122) and siren device 105l in geographic zone 5 (128) are members of siren activation group 132, siren devices 105f, 105g, 105h, and 105i in geographic zone 3 (124) are members of siren activation group 134, siren devices 105m, 105n, and 105o in geographic zone 5 (128) are members of siren activation group 136, and siren devices 105b and 105c in geographic zone 1 (120) are members of siren activation group 138. In addition, all the siren devices 105a-105o are members of siren activation group 140. In the illustrated embodiment, siren activation group 132 includes siren devices 105 in two geographic zones and siren device 105b is a member of two siren activation zones. In some embodiments, all members of a siren activation group may be located in the same geographic zone. In some embodiments, each siren device 105 may only be a member of a single siren activation group. In at least some embodiments, each siren device 105 may store information locally indicating the respective geographic zones in which each siren device 105 in the siren-based alert system 100 is located and the respective siren activation group or groups to which each siren device 105 in the siren-based alert system belongs. In other embodiments, each given siren device 105 may only store information locally indicating the respective geographic zones and the respective siren activation groups associated with siren devices 105 located in the same geographic zone as the given siren device and associated with siren devices 105 that are members of a same siren activation group as the given siren.

In the example siren-based alert system 100 illustrated in FIG. 1, if the central siren controller 110 broadcasts an activation command indicating that the siren devices 105 in a particular siren activation group should be activated, each of the siren devices in the particular siren activation group that receives the activation command should generate and output an audible alert that is modulated to include a unique identifying characteristic. Each siren device 105 in the same geographic zone as any of the members of the particular siren activation group should be able to receive and identify the audible alerts generated by the members of the particular siren activation group in the same geographic zone based on their unique identifying characteristics. In at least some embodiments, if a given one of the siren devices 105 in the particular siren activation group did not receive the command (e.g., due to a lost connection in a communication channel between the siren device 105 and the central siren controller 110 or a malfunction of a receiver or network interface of the siren device 105) and the given siren device 105 did not generate and output an audible alert, the other siren devices in the same geographic zone as the given device will, based on the absence of an audible alert from the given siren device 105, detect this condition as a potential siren fault. In some embodiments, if a given one of the siren devices 105 in the particular siren activation group received the command but the given siren device 105 did not generate and output an audible alert (e.g., due to a malfunction in the alert generation circuitry of the given siren device 105, a malfunction of a speaker of the given siren device 105, or another fault in the siren device 105), the other siren devices in the same geographic zone as the given device will, based on the absence of an audible alert from the given siren device 105, detect this condition as a potential siren fault, as well. When a siren device 105 detects such conditions as potential siren faults, the siren device may take corrective action. In at least some embodiments, the corrective action may include sending a siren fault notification to the central siren controller 110 indicating a failure to detect the unique identifying characteristic of a siren device that was expected to be activated. As described in more detail below, in some embodiments, the corrective action may include modifying an audible alert generated by the siren device that detected the siren fault to compensate for the failure of the faulty siren device to generate an audible alert.

In one example, if, subsequent to the central siren controller 110 broadcasting an activation command directed to siren activation group 134, the unique identifying characteristic associated with siren device 105f is not detectable by siren device 105g, siren device 105g may take corrective action by sending a notification of a siren fault at siren device 105f to the central controller 110. Similarly, if the unique identifying characteristic associated with siren device 105f is not detectable by siren device 105i, siren device 105i may take corrective action by sending a notification of a siren fault at siren device 105f to the central controller 110. However, if the unique identifying characteristic associated with siren device 105f is detected by siren device 105h, siren device 105h will take no corrective action. In this example, because no notification of a siren fault at siren device 105f was received from siren device 105h, indicating that at least one of the siren devices in the same geographic zone as siren device 105f detecting its audible alert, central siren controller 110 may take no action in response to the siren fault notifications received from siren devices 105g and 105i.

In a second example, if, subsequent to the central siren controller 110 broadcasting an activation command directed to siren activation group 136, the unique identifying characteristic associated with siren device 105o is not detectable by any of siren devices 105l, 105m, or 105n, all of which are in the same geographic zone as siren device 105o but only two of which are members of siren activation group 136, each of the siren devices 105l, 105m, and 105n may take corrective action by sending a notification of a siren fault at siren device 105o to the central controller 110. In this example, because notifications of a siren fault at siren device 105o were received from all the siren devices in the same geographic zone as siren device 105o, central siren controller 110 may take further action in response to the siren fault notifications received from siren devices 105l, 105m, and 105n. In one example, the central siren controller may broadcast a command to siren devices 105l, 105m, and 105n to cause them to modify their audible alerts to compensate for the failure of siren device 105o. In another example, the central siren controller may attempt to communicate with siren device 105o, e.g., over an LMR network, to interrogate siren device 105o as to its status.

In a third example, subsequent to the central siren controller 110 broadcasting an activation command directed to siren activation group 132, the unique identifying characteristic associated with siren device 105d should be detectable by siren device 105e, which is in the same geographic zone as siren device 105d. Likewise, the unique identifying characteristic associated with siren device 105e should be detectable by siren device 105d. If the unique identifying characteristic associated with siren device 105d is not detectable by siren device 105e or if the unique identifying characteristic associated with siren device 105e is not detectable by siren device 105d, notifications of a siren fault at one of these siren devices may be sent to the central siren controller 110 by the other one of the siren devices. In this example, siren device 105l, which is a member of siren activation group 132, is located in a different geographic zone than the other two members of siren activation group 132. In this case, the unique identifying characteristic associated with siren device 105l should be detectable by siren devices 105m, 105n, and 105n. Note that, even though siren devices 105m, 105n, and 105n are not members of the siren activation group targeted by the activation command, they may receive the activation command when it is broadcast. As previously noted, each siren device 105 may store information locally indicating the respective geographic zones in which each siren device 105 is located and the respective siren activation groups to which each siren device 105 belongs. In this example, in response to the activation command, and based on information stored locally at siren devices 105m, 105n, and 105n indicating that siren device 105l should be activated by the activation command, siren devices 105m, 105n, and 105n may attempt to detect the unique identifying characteristic associated with siren device 105l. If the unique identifying characteristic associated with siren device 105l is not detectable by any one or more of these devices, they may take corrective action by sending a notification of a siren fault at siren device 105l to the central siren controller 110.

In a fourth example, subsequent to the central siren controller 110 broadcasting an activation command directed to siren activation group 138, the unique identifying characteristic associated with siren device 105c should be detectable by siren devices 105a and 105b, both of which are in the same geographic zone as siren device 105c, but only one of which is a member of siren activation group 138. If the unique identifying characteristic associated with siren device 105c is not detectable by one of siren devices 105a and 105b, a notification of a siren fault at siren device 105c may be sent to the central siren controller 110 by the siren device that detected the siren fault condition. If siren fault notifications are received from both siren device 105a and siren device 105b, indicating that no siren device in the same geographic zone as siren device 105c was able to detect the unique identifying characteristic associated with siren device 105c, the central siren controller may take further corrective action.

In a fifth example, subsequent to the central siren controller 110 broadcasting an activation command directed, individually, to siren device 105j, the unique identifying characteristic associated with siren device 105j should be detectable by siren device 105k, which is in the same geographic zone as siren device 105j. If the unique identifying characteristic associated with siren device 105j is not detectable by siren device 105k, siren device 105k may take corrective action by sending a notification of a siren fault at siren device 105j to the central siren controller 110.

In some embodiments, the siren devices in a geographic zone in which none of the siren devices are targets of a received activation command may not expect to receive, or hear, an audible alert output by any siren device in the geographic zone and may not attempt to detect any of the unique identifying characteristics associated with any of the siren devices in the siren-based alert system. In other embodiments, each of the siren devices may, either continuously or periodically, attempt to detect the unique identifying characteristics associated with the other siren devices in its geographic zone regardless of whether any of the siren devices in its geographic zone are expected to generate and output an audible alert. As described in more detail below, in some embodiments a first siren device in a given geographic zone may detect an unexpected audible alert including a unique identifying characteristic associated with a second siren device in the given geographic zone that was not a target of a recently received activation command. In this case, the first siren device may take corrective action including sending a notification of a siren fault to a central siren controller indicating the unexpected detection of the unique identifying characteristic associated with the second siren device. In response to receiving the notification, the central siren controller may, for example, determine whether the unexpected audible alert was a false alarm caused by a loss of communication or a malfunction of the second siren device or whether the first device failed to receive a valid activation command that it should have received. In the former case, the central siren controller may send (e.g., over an LMR network) a notification to the first siren device indicating that the first siren device should ignore the audible alert from the second siren device as a false alarm. In the latter case, the central siren controller may send a notification (e.g., over the LMR network) indicating that the first siren device should generate and output an audible alert, including its unique identifying characteristic or may resend an activation command to a siren activation group that includes the first siren device or to the first siren individually.

Note that while siren-based alert system 100 illustrated in FIG. 1 includes one central siren controller 110, in other embodiments, a siren-based alert system may include more than one siren controller. For example, a redundant siren controller may be configured to broadcast the same activation commands as the central siren controller, in some embodiments. In some embodiments, a redundant siren controller may be co-located with the central siren controller. In other embodiments, a redundant siren controller may be located in a different geographic location or zone and may provide failover capability in the case that the central siren controller is damaged during a severe weather event, natural disaster or other public safety emergency.

Figure 2:
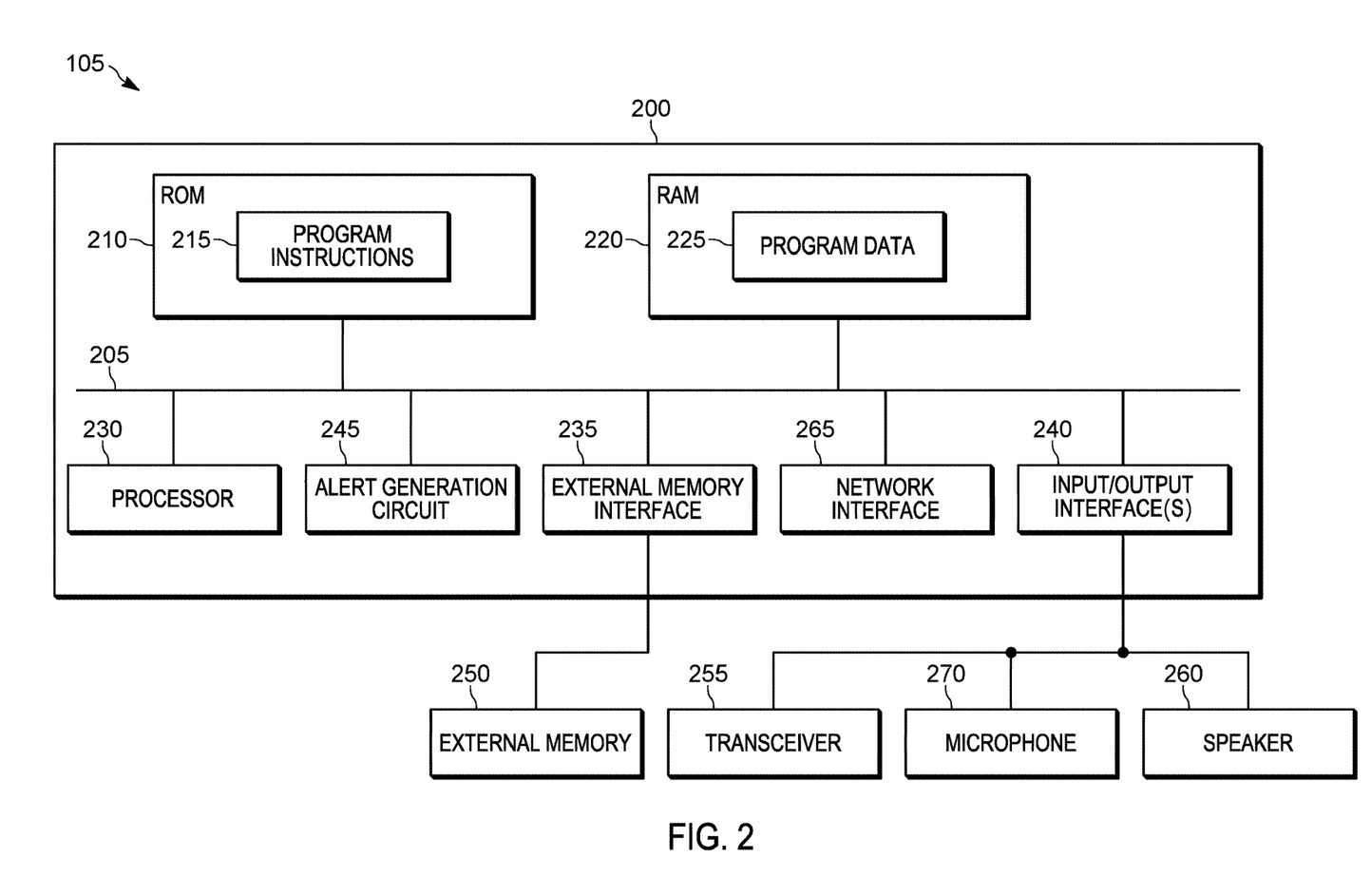
FIG. 2 is a block diagram illustrating selected elements of an example siren device for a siren-based alert system, in accordance with some embodiments.

FIG. 2 is a block diagram illustrating selected elements of an example siren device 105 for a siren-based alert system, in accordance with some embodiments. In the illustrated example, siren device 105 includes a local siren controller 200 comprising a Read Only Memory (ROM) 210, a Random Access Memory (RAM) 220, an electronic processor 230, one or more input/output device interfaces 240 for communicating with locally attached devices and components, an external memory interface 235 through which local siren controller 200 of siren device 105 may be coupled to an external memory 250, an alert generation circuit 245, and a network interface 265, all of which are coupled to a system bus 205 through which they communicate with each other. External memory 250 may include, for example, a hard-disk drive (HDD), an optical disk drive such as a compact disk (CD) drive or digital versatile disk (DVD) drive, a solid-state drive (SSD), a tape drive, a flash memory drive, or a tape drive, to name a few. In various embodiments, the electronic processor 230 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware. Siren device 105 also includes a transceiver 255, a microphone 270 for detecting sounds, and a speaker 260 to output sounds including audible alerts that have been modulated to include a unique identifying characteristic associated with the siren device 105.

In the illustrated embodiment, ROM 210 stores program instructions 215, at least some of which may be executed by the electronic processor 230 to perform the methods described herein. For example, any or all of the operations of method 300 illustrated in FIG. 3, method 400 illustrated in FIG. 4, and method 500 illustrated in FIG. 5 may be performed by program instructions 215 executing on electronic processor 230 of the local siren controller 200 of siren device 105. In some embodiments, program instructions 215 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In some embodiments, program instructions 215 may include program instructions that when executed by electronic processor 230 implement other functionality features of siren device 105 or local siren controller 200.

In this example embodiment, RAM 220 may, from time to time, store program data 225 including, without limitation, information indicating which siren devices are members of particular geographic zones and/or siren activation groups, unique identifying characteristics of the audible alerts generated by various siren devices, configuration information including an indication of an applicable false alarm mode, activation and/or cancellation commands received by the siren device 105, and/or other data accessible by program instruction 215 and used in performing the methods described herein. In some embodiments, any or all of this information may be stored in a programmable non-volatile memory, such as in external memory 250 of siren device 105. For example, during configuration of siren device 105, or of a siren-based alert system that includes siren device 105, siren device 105 may receive and store information indicating which siren devices are members of particular geographic zones and/or which siren devices are members of particular siren activation groups. Information indicating that two or more siren devices are co-located in the same geographic zone may identify those siren devices as being at geographic distances from each other in a range of geographic distances within which audible alerts generated by any of those siren devices are detectable by all of the other ones of those siren devices. The siren device 105 may also receive and store unique identifying characteristics of the audible alerts generated by the siren device 105 itself and/or unique identifying characteristics of the audible alerts generated by other siren devices. In some embodiments, the siren device 105 may receive and store information indicating which of multiple false alarm policies is enabled, one of which may be a default false alarm policy for the siren device 105. Multiple such false alarm policies are described in more detail below.

In some embodiments, only information associated with siren devices that are located in the same geographic zone or are members of one or more common siren activation groups may be stored locally on the siren device 105. In other embodiments, information associated with all siren devices in a siren-based alert system may be stored locally on some or all of the siren devices in the siren-based alert system. For example, in at least some embodiments, each siren device may store information locally indicating the respective geographic zones in which each siren device in the siren-based alert system is located and the respective siren activation group or groups to which each siren device in the siren-based alert system belongs. In other embodiments, each given siren device may only store information locally indicating the respective geographic zones and the respective siren activation groups associated with siren devices 105 located in the same geographic zone as the given siren device and associated with siren devices 105 that are members of a same siren activation group as the given siren device.

In at least some embodiments, in response to receiving an activation command at siren device 105, program instruction 215 may cause electronic processor 230 to store information identifying a collection of siren devices to be activated by the activation command within program data 225. If the activation command includes information specifying a respective unique identifying characteristic associated with each of the siren devices in the identified collection of siren devices to be activated, program instruction 215 may cause electronic processor 230 to store this information within program data 225, as well. In some embodiments, RAM 220 may also store data used in performing other functions of siren device 105 or local siren controller 200. In some embodiments, RAM 220 may, from time to time, store local copies of all or a portion of program instructions 215 or other program instructions copied from ROM 210 and/or copied from external memory 250 over external memory interface 235.

In this example embodiment, input/output device interfaces 240 may include one or more analog input interfaces, such as one or more analog-to-digital (A/D) convertors, or digital interfaces for receiving signals or data from, and sending signals or data to, one or more input/output devices. For example, siren device 105 may communicate with transceiver 255, microphone 270, and speaker 260 through various input/output device interfaces 240. In various embodiments, input/output device interfaces 240 may operate to allow local siren controller 200 of siren device 105 to receive user input, to receive commands and other information from and to provide information to a central siren controller 110, to receive audio signals from another siren device 105, and/or to provide system output, such as an audible alert. User input may be provided, for example, via microphone 270 or via a keyboard or keypad, soft keys, icons, or soft buttons on a touch screen of a display, a scroll ball, a mouse, buttons, and the like (not shown in FIG. 2). In some embodiments, input/output device interfaces 240 may include a graphical user interface (GUI) generated, for example, by electronic processor 230 from program instructions 215 and program data 225 and presented on a display, enabling a user to interact with the display. Input/output device interfaces 240 may also include other input mechanisms, which for brevity are not described herein and which may be implemented in hardware, software, or a combination of both.

Any or all of the input/output devices 255, 260, and 270 may be configured to send data to or receive data from local siren controller 200 over one or more data lines through input/output interfaces 240, in various embodiments. Similarly, any or all of these input/output devices 255, 260, and 270 may be configured to assert or receive a control signal from local siren controller 200 over one or more connections through input/output interfaces 240. In response to receiving various inputs from input/output devices 255, 260, and 270, the electronic processor 230 of local siren controller 200 may execute program instructions to detect potential siren faults at neighbor siren devices and to take corrective action, if so.

Siren device 105 may support one or more types of communication, such as to receive status interrogations from and send siren fault notifications to central siren controller 110, including, but not limited to audio communication and data communication, using one or more types of transmission including, but not limited to standing wave radio transmission, land mobile radio (LMR) transmission, and long-term evolution (LTE) transmission. In some embodiments that are deployed by public safety organizations, communications for mission critical operations may include, but are not limited to, communications over a high-powered land mobile radio network or a public safety long-term evolution (PS LTE) network. In some embodiments, transceiver 255 or microphone 270 may receive an incoming audio signal, which may be an analog or digital audio signal. For example, in various embodiments, transceiver 255 may be or include an LMR transceiver, an LTE transceiver, a WiFi transceiver, or another type of audio transceiver. In some embodiments, an analog audio signal may be received by transceiver 255 and the analog audio signal may be converted to a digital audio signal and processed by one or more components of local siren controller 200, including but not limited to an analog-to-digital converter (ADC) and a digital signal processor (DSP). For example, electronic processor 230 may include digital signal processing functionality. In some embodiments, electronic processor 230 of local siren controller 200, may receive an incoming audio signal from microphone 270 or transceiver 255. The incoming audio signal may represent one or more audible alerts, including but not limited to audible alerts generated and output by other instances of siren device 105, each of which has been modulated to include a unique identifying characteristic, Circuitry within local siren controller 200, such as an ADC or a DSP may be configured to apply one or more signal processing techniques to the received audio signal in an attempt to isolate or extract a unique identifying characteristic of another siren device in the same geographic zone from the received audio signal and to identify its source.

In the illustrated embodiment, local siren controller 200 includes alert generation circuit 245 to generate an audible alert in response to receiving an activation command targeting the siren device 105 (whether individually or as part of a siren activation group). More specifically, alert generation circuit 245 may include analog and/or digital circuitry configured to generate an audible siren and to modulate the audible siren to include a unique identifying characteristic associated with siren device 105. The unique identifying characteristic associated with the siren device 105 may include, among other things, data encoded in the audible alert, data transmitted using a sideband modulation of the audible alert, a particular pitch of the audible alert, or a particular period of the audible alert. In one example, modulating the audible alert may include encoding unique identifying information in the low band frequencies that, although not audible to the human ear, can transmit information detectable in the audio signal by other siren devices that receive the audio signal. In another example, modulating the audible alert may involve performing a particular shift of the audio signal. As previously noted, information indicating the unique identifying characteristic of the audible alerts generated by the siren device 105 may be stored in locally-accessible memory on siren device 105, such as in external memory 250 or as program data 225 stored, from-time-to-time, in RAM 220. In some embodiments, subsequent to storing the information indicating the unique identifying characteristic of the audible alerts generated by the siren device 105 in locally-accessible memory, the unique identifying characteristic may be dynamically modified in response to receiving an activation command directed to the siren device 105 and specifying a new unique identifying characteristic for the siren device 105. In some embodiments, alert generation circuit 245 may be a stand-alone component of siren device 105 rather than an element of local siren controller 200, as shown in FIG. 2.

Network interface 265 may be a suitable system, apparatus, or device operable to serve as an interface between electronic processor 230 and a network. In some embodiments, network interface 265 may enable local siren controller 200 of siren device 105 to communicate with a server or a remote device (not shown in FIG. 2) over a network using a suitable transmission protocol and/or standard, including, but not limited to, transmission protocols and/or standards enumerated below with respect to the discussion of the network. In some embodiments, network interface 265 may be communicatively coupled via a network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. Network interface 265 may enable wired and/or wireless communications to and/or from siren device 105 or other elements of a siren-based alert system.

In some embodiments, a central siren controller, such as central siren controller 110 illustrated in FIG. 1, may include elements similar to the elements of local siren controller 200 of siren device 105 illustrated in FIG. 2. For example, a central siren controller may include any or all of a ROM 210, a RAM 220 storing program data 225, an electronic processor 230, an external memory interface 235, a network interface 265, and one or more input/output interfaces 240, among other elements. In one such embodiment, ROM 210 stores program instructions 215, at least some of which may be executed by the electronic processor 230 to perform any or all of the operations of the central siren controller 110, as described herein. For example, the program instructions 215 may, when executed by electronic processor 230 of the central siren controller, cause the central siren controller to perform, at various times, broadcasting an activation command, receiving a siren fault notification, determining whether an audible alert represents a false alarm, and broadcasting a cancellation command, among other functionally. In various embodiments, central siren controller 110 may include more, fewer, or different elements than those of local siren controller 200 illustrated in FIG. 2.

Figure 3:
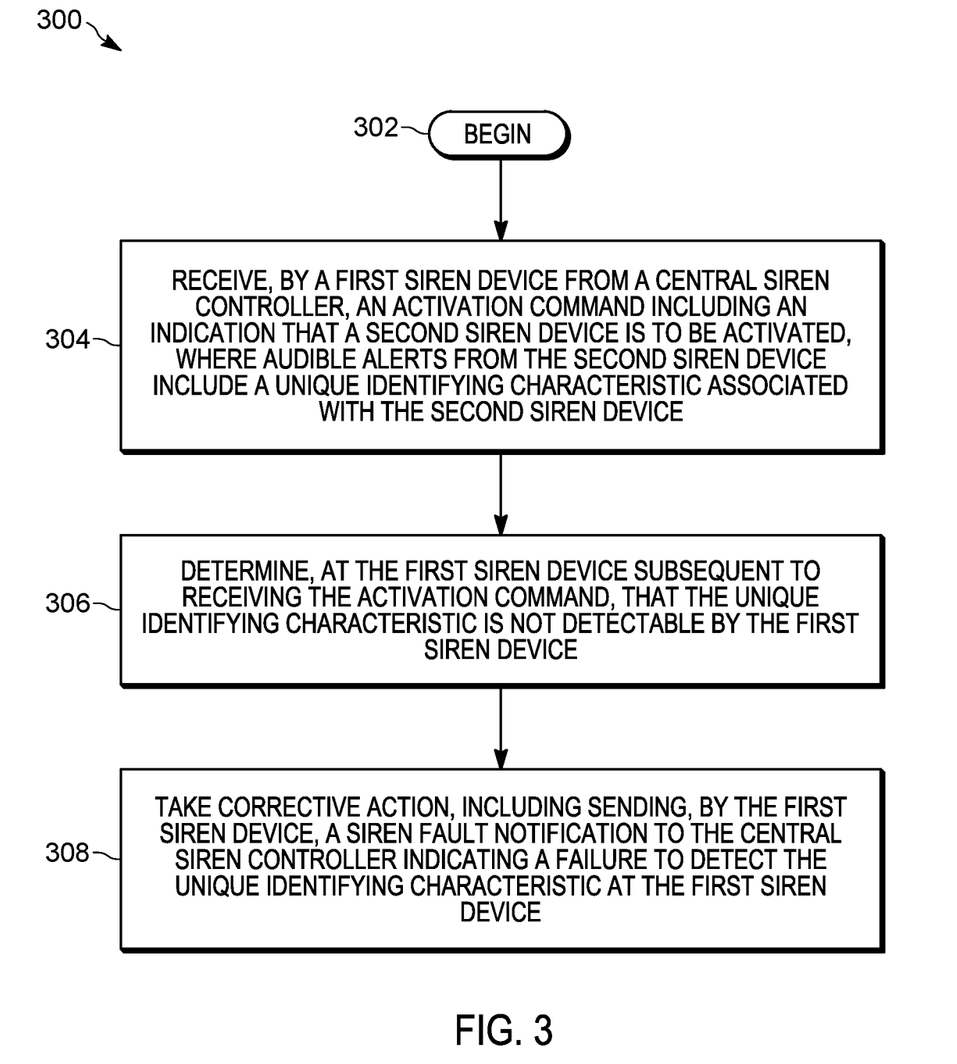
FIG. 3 is a flowchart illustrating selected elements of an example method for detecting a fault in a siren-based alert system, in accordance with some embodiments.

FIG. 3 is a flowchart illustrating selected elements of an example method 300 for detecting a fault in a siren-based alert system, in accordance with some embodiments. In at least some embodiments, some or all of the operations shown in FIG. 3 may be performed by a local siren controller of a siren device, such as local siren controller 200 of siren device 105 illustrated in FIG. 2. In at least some embodiments, the local siren controller 200 may include a processor and a memory storing instructions that when executed by the processor cause the processor to perform any of the operations illustrated in FIG. 3. In other embodiments, the local siren controller 200 may include a hardware state machine or other electronic circuitry configured to perform one or more of the operations illustrated in FIG. 3. While a particular order of operations is indicated in FIG. 3 for illustrative purposes, the timing and ordering of such operations may vary where appropriate without negating the purpose and advantages of the examples set forth in detail throughout the remainder of this disclosure.

In this example embodiment, method 300 begins at block 302 in FIG. 3 and continues at block 304 with receiving, by a first siren device from a central siren controller, an activation command including an indication that a second siren device is to be activated, where audible alerts from the second siren device include a unique identifying characteristic associated with the second siren device. For example, in some embodiments, the activation command may include a bitmap in which each siren device in the siren-based alert system is represented by a respective bit and in which the bits representing siren devices to be activated, including the second siren device, are set. In other embodiments, the indication that the second siren device is to be activated may be represented in the activation command by an identifier of the second siren device or by an identifier of a siren activation group that includes the second siren device.

At 306, the method includes determining, at the first siren device subsequent to receiving the activation command, that the unique identifying characteristic included in audible alerts generated and output by the second siren device is not detectable by the first siren device. For example, after receiving the activation command including an indication that the second siren device is to be activated and based on information indicating that the first siren device should be able to hear audible alerts generated and output by the second siren device, the first siren device may begin "listening" for audible alert that includes the unique identifying characteristic associated with the second siren device. The listening may include a microphone or other receiver of the siren device detecting sounds as received audio signals and the local siren controller applying one or more signal processing techniques to the received audio signals in an attempt to isolate or extract the respective unique identifying characteristics of the second siren device and any other activated siren device in its geographic zone from the received audio signals and to identify their sources.

At 308, method 300 includes taking corrective action in response to failing to detect the unique identifying characteristic of the second siren device. In at least some embodiments, the corrective action may include the first siren device sending a siren fault notification to the central siren controller indicating a failure to detect the unique identifying characteristic at the first siren device. In some embodiments, taking corrective action may also include the first siren modifying an audible alert generated by the first siren device to compensate for a failure of the second siren device to generate an audible alert. Modifying the audible alert may include, for example, changing a position, orientation, or panning motion of the first siren device, or increasing the power or volume of the audible alert generated by the first siren device, each of which may result in increasing the geographic area covered by the first siren device to include at least a portion of the geographic area that would otherwise have been covered by the second siren device. In some embodiments, in response to receiving the siren fault notification for the second siren device, the central siren controller may broadcast a command directed to additional neighbors of the second siren device to cause them to modify their audible alerts to compensate for the failure of the second siren device by covering respective portions of the geographic area that would otherwise have been covered by the second siren device.

Figure 4:
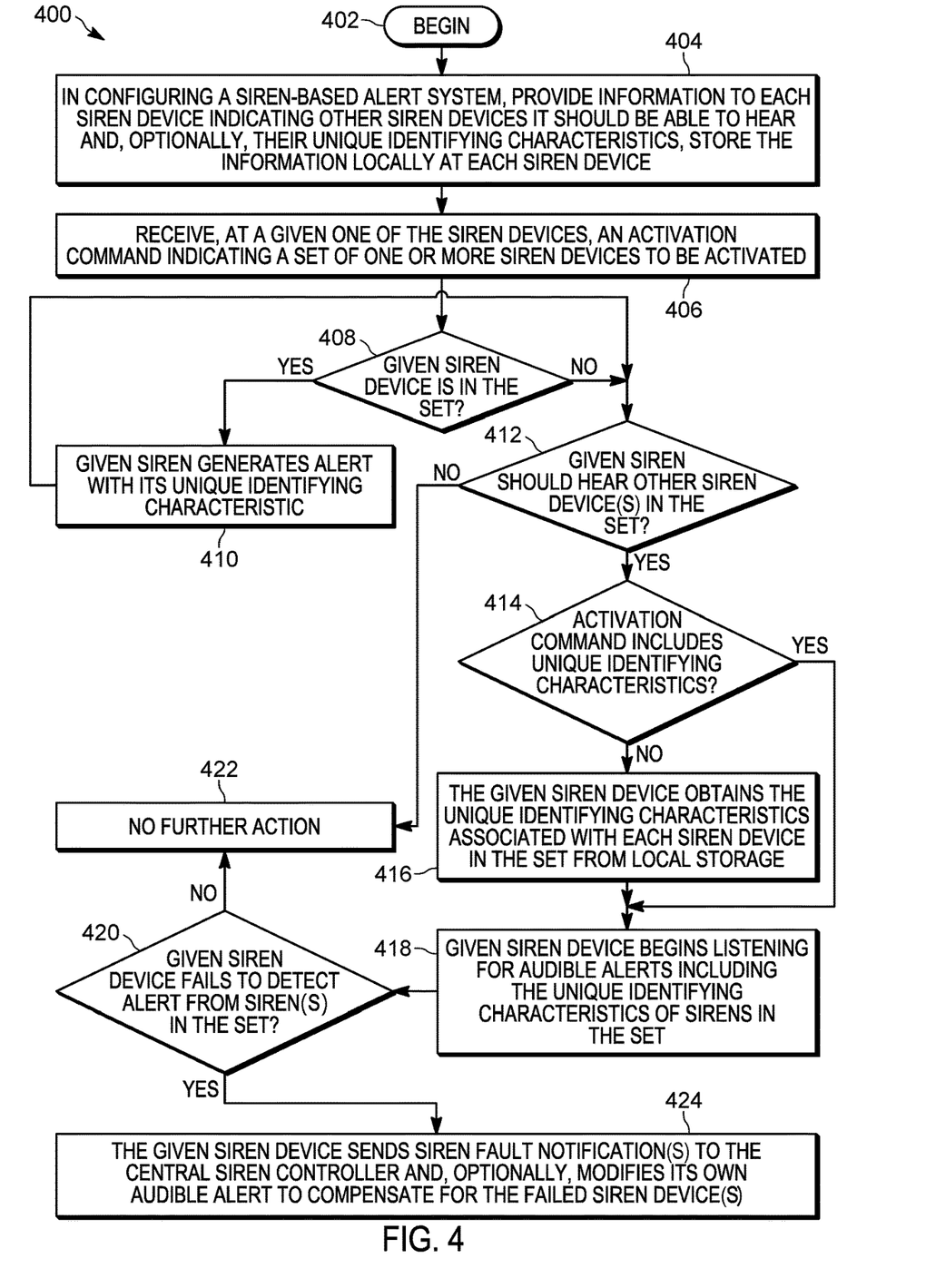
FIG. 4 is a flowchart illustrating selected elements of an example method for configuring and using siren devices in a siren-based alert system to detect faults involving neighbor siren devices, in accordance with some embodiments.

FIG. 4 is a flowchart illustrating selected elements of an example method 400 for configuring and using siren devices in a siren-based alert system to detect faults involving neighbor siren devices, in accordance with some embodiments. In at least some embodiments, some or all of the operations shown in FIG. 4 may be performed by a local siren controller of a siren device, such as local siren controller 200 of siren device 105 illustrated in FIG. 2. In at least some embodiments, the local siren controller 200 may include a processor and a memory storing instructions that when executed by the processor cause the processor to perform any of the operations illustrated in FIG. 4. In other embodiments, the local siren controller 200 may include a hardware state machine or other electronic circuitry configured to perform one or more of the operations illustrated in FIG. 4. While a particular order of operations is indicated in FIG. 4 for illustrative purposes, the timing and ordering of such operations may vary where appropriate without negating the purpose and advantages of the examples set forth in detail throughout the remainder of this disclosure.

In this example embodiment, method 400 begins at block 402 in FIG. 4 and continues at block 404 where, in configuring a siren-based alert system, information is provided to each siren device indicating other siren devices in the siren-based alert system it should be able to hear, i.e., siren devices in the same geographic zone. The information may, optionally, include information indicating the respective unique identifying characteristics of the other siren devices. In some embodiments, the information may indicate the respective siren activation group or groups to which particular siren devices belong. The method may include storing the received information locally at each siren device. In some embodiments, a siren device may receive and store locally only information that is associated with other siren devices in the same geographic zone or in a common siren activation group. In other embodiments every siren device in the siren-based alert system may receive and store locally information associated with all of the siren devices in the siren-based alert system.

At 406, the method includes receiving, at a given one of the siren devices, an activation command indicating a set of one or more siren devices to be activated. In some embodiments, the siren devices in the set of siren devices to be activated may be identified individually in the activation command. For example, in some embodiments, the activation command may include a bitmap in which each siren device in the siren-based alert system is represented by a respective bit and in which the bits representing siren devices to be activated are set. In other embodiments, the activation command may include a respective identifier of each of the siren devices in the set of siren devices to be activated. In some embodiments, the set of siren devices to be activated may represent one or more predefined siren activation groups, such as those described herein, and the activation command may include a respective identifier of each siren activation group whose members are included in the set of siren devices to be activated.

If, at 408, it is determined that the given siren device is a member of the set of siren devices to be activated, whether the given siren device is identified in the activation command individually or as part of an activation group targeted by the activation command, method 400 may proceed to 410. Otherwise, method 400 may continue at 412.

At 410, the method includes the given siren device generating and outputting an audible alert onto which its unique identifying characteristic has been modulated. As described herein, information indicating the unique identifying characteristic that should be modulated onto the audible alert generated and output by the given siren device may be stored locally on the given siren device, in some embodiments. For example, a unique identifying characteristic associated with the given siren device may be pre-programmed (e.g., hard-coded into a ROM) on the given siren device or may be programmed into a RAM or a programmable non-volatile memory when the given siren device, or the siren-based alert system, is initialized or subsequently reconfigured. In other embodiments, information indicating the unique identifying characteristic that should be modulated onto the audible alert generated and output by the given siren device may be included in the received activation command.

If, at 412, it is determined that the given siren device should be able to hear other one or more other siren devices in the set of siren devices to be activated, method 400 may continue at 414. Otherwise, the method may proceed directly to 422, where no further action is taken in response to receiving the activation command. For example, in some embodiments, if none of the siren devices in the set of siren devices to be activated are in the same geographic zone as the given siren device, the given siren device may refrain from listening for any audible alerts generated and output by the siren devices in the set. In other embodiments, the given siren device may always be listening for audible alerts generated and output by siren devices in the siren-based alert system but may ignore any audible alerts it hears when no audible alerts are expected to be heard.

If, at 414, the activation command includes the respective unique identifying characteristics for the siren devices in the set of siren devices to be activated, method 400 may proceed to 418. Otherwise, the method may continue at 416, with the given siren device obtaining the unique identifying characteristics associated with each siren device in the set from local storage. For example, in various embodiments, the unique identifying characteristics associated with some or all of the siren devices in the siren-based alert system may be received and stored locally on the given siren device during an initialization or reconfiguration of the siren-based alert system or may be stored locally in response to receipt of a previous activation command that included this information.

At 418, the method includes given siren device beginning to listen for audible alerts including the unique identifying characteristics of the siren devices in the set. The listening may include, for example, a microphone or other receiver of the given siren device detecting sounds as received audio signals and circuitry within the local siren controller applying one or more signal processing techniques to the received audio signals in an attempt to isolate or extract the respective unique identifying characteristics of the siren devices in the set that are also its geographic zone from the received audio signals to identify their sources.

If, at 420, the given siren device fails to detect an audible alert from one or more of the siren devices in the set that are also in its geographic zone (i.e., audible alerts modulated to include the respective unique identifying characteristics associated with those siren devices), the method may continue at 424. Otherwise, the method may proceed to 422, where no further action is taken in response to receiving the activation command.

At 424, method 400 includes the given siren device taking corrective action, including sending one or more siren fault notifications to the central siren controller. For example, in some embodiments, the given device may send a separate siren fault notification to the central siren controller for each siren device for which the given siren device should have been able to detect an audible alert but for which the given siren device failed to do so, and each siren fault notification may include an indication of a respective one of the potentially faulty siren devices. In other embodiments, the given siren device may send a single siren fault notification to the central siren controller indicating all of the siren devices for which the given siren device failed to detect an audible alert that the given siren device would be expected to detect. For example, the siren fault notification may include a bitmap or list of siren device identifiers indicating which of the siren devices are potentially faulty. In some embodiments, the method may, optionally, include the given siren device modifying its own audible alert to compensate for the failed siren devices. Modifying the audible alert may include, for example, changing a position, orientation, or panning motion of the given siren device, or increasing the power or volume of an audible alert generated by the given siren device.

Figure 5:
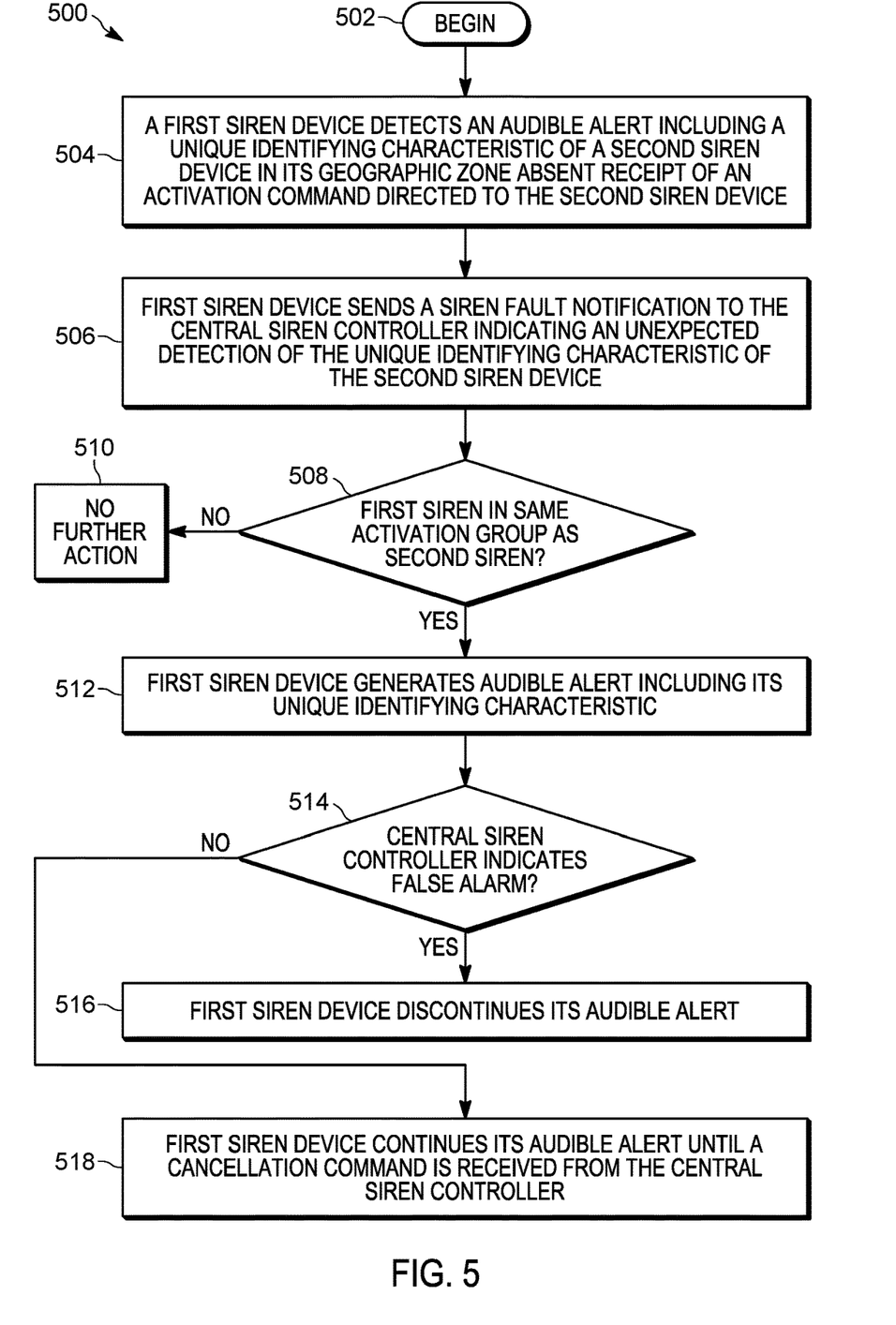
FIG. 5 is a flowchart illustrating selected elements of an example method for determining whether an audible alert output by a siren device in a siren-based alert system represents a false alarm, in accordance with some embodiments.

FIG. 5 is a flowchart illustrating selected elements of an example method 500 for determining whether an audible alert output by a siren device in a siren-based alert system represents a false alarm, in accordance with some embodiments. In at least some embodiments, some or all of the operations shown in FIG. 5 may be performed by a local siren controller of a siren device, such as local siren controller 200 of siren device 105 illustrated in FIG. 2. In at least some embodiments, the local siren controller 200 may include a processor and a memory storing instructions that when executed by the processor cause the processor to perform any of the operations illustrated in FIG. 5. In other embodiments, the local siren controller 200 may include a hardware state machine or other electronic circuitry configured to perform one or more of the operations illustrated in FIG. 5. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, method 500 begins with block 502 in FIG. 5 and continues with block 504 where a first siren device detects an audible alert including a unique identifying characteristic of a second siren device in its geographic zone absent the receipt of an activation command directed to the second siren device or targeting a siren activation group that includes the second siren device. For example, once initialized or reconfigured, the first siren device may continuously or periodically listen for audible alerts including the unique identifying characteristics of the siren devices in its geographic zone, including the second siren device. The listening may include, for example, a microphone or other receiver of the first siren device detecting sounds as received audio signals and circuitry within the local siren controller applying one or more signal processing techniques to the received audio signals in an attempt to isolate or extract the respective unique identifying characteristics of the siren devices in the set that are also its geographic zone from the received audio signals to identify their sources.

In various embodiments, there may be multiple possible reasons that the unique identifying characteristic of the second siren device was unexpectedly detected by the first siren device. In one example, an activation command that was received by the second siren device and included an indication that the second siren device should be activated might not have been received by the first siren device due, for example, to a lost connection in a communication channel between the first siren device and the central siren controller or a malfunction of a receiver or network interface of the first siren device. If the activation command indicated that the first siren device should also be activated, this scenario may represent a siren fault at the first siren device rather than a siren fault at the second siren device. In another example, the second siren device may have inadvertently generated and output an audible alert onto which its unique identifying characteristic was modulated without receiving an activation command, or in response to receiving an activation command that did not target the second siren device nor the first siren device, due to a malfunction on the second siren device. This scenario may represent a siren fault at the second siren device. However, the first siren device may be unable to distinguish between a scenario in which there is a siren fault at the first device and a scenario in which there is a siren fault at the second siren device. Therefore, in at least some embodiments, the first siren device may, in response to the unexpected detection of the unique identifying characteristic of the second siren device, proactively take action to respond to the unexpected detection and/or to determine whether or not the unexpected detection is related to a false alarm condition at the second siren device.

For example, at 506, the method includes the first siren device sending a siren fault notification to the central siren controller indicating an unexpected detection of the unique identifying characteristic of the second siren device. The siren fault notification may include an identifier of the second siren device and an indication that the unique identifying characteristic of the second device was detected by the first siren device absent the receipt of an activation command directed to the second siren device or to a siren activation group that includes the second siren device and/or an indication that the audible alert generated and output by second siren device potentially represents a false alarm. If, at 508, it is determined that first siren device is in the same activation group as the second siren device, the method may proceed to 512. Otherwise, the method may proceed to 510, where no further action is taken by the first siren device in response to the unexpected detection of the unique identifying characteristic of the second siren device.

In the illustrated example, at 512, method 500 includes the first siren device proactively initiating the generation of an audible alert onto which its unique identifying characteristic has been modulated and causing the generated audible alert to be output by its speaker. For example, a first false alarm policy applicable to the first siren device may specify that, if a unique identifying characteristic of one siren device is unexpectedly detected by another siren device in the same geographic zone, the detecting siren device should assume, until and unless it receives a cancellation command broadcast from the central siren controller, that it should also be activated. In other embodiments, a second false alarm policy may specify that, if a unique identifying characteristic of one siren device is unexpectedly detected by another siren device in the same geographic zone, the detecting siren device should assume, until and unless it receives an activation command from the central siren controller, that it should not be activated. As described herein, information indicating the unique identifying characteristic that should be modulated onto the audible alert generated and output by the first siren device may be stored locally on the first siren device, in some embodiments. For example, a unique identifying characteristic associated with the first siren device may be pre-programmed (e.g., hard-coded into a ROM) on the first siren device or may be programmed into a RAM or a programmable non-volatile memory when the first siren device, or the siren-based alert system, is initialized or subsequently reconfigured. In other embodiments, information indicating the unique identifying characteristic that should be modulated onto the audible alert generated and output by the first siren device may have been included in a previously received activation command.

If, at 514, a response received by the first siren device from the central siren controller indicates that the unexpected detection of the unique identifying characteristic associated with the second siren device represents a false alarm, i.e., a siren fault at the second siren device, method 500 may continue at 516. Otherwise, the method may proceed to 518. At 516, subsequent to the first siren device receiving the response from the central siren controller, method 500 includes the first siren device discontinuing the audible alert that it proactively generated and output.

On the other hand, if no response is received from the central siren controller subsequent to the first siren device sending the siren fault notification to the central siren controller at 506, or if a response received from the central siren controller indicates that the unexpected detection of the unique identifying characteristic associated with the second siren device does not represent a false alarm and/or that the first siren device should also be activated, the method includes, at 518, the first siren device continuing to output its audible alert until a cancellation command broadcast by the central siren controller is received at the first siren device. In response to receiving a cancellation command broadcast by the central siren controller and directed to the first siren device or a siren activation group that includes the first siren device, the first siren device may refrain from generating and outputting an audible alert.

While FIG. 5 illustrates an embodiment of a method for determining whether an audible alert output by a siren device in a siren-based alert system represents a false alarm in accordance with the first false alarm policy described above, in other embodiments, a method for determining whether an audible alert output by a siren device in a siren-based alert system represents a false alarm may apply the second false alarm policy described above, or another false alarm policy. Under the second false alarm policy, the first siren device may send a siren fault notification to the central siren controller, as in 506, but might not activate its own audible alert until and unless it receives a response from the central siren controller indicating that it should do so. In some embodiments, a siren-based alert system, or certain ones of the siren devices thereof, may support two or more false alarm policies. In various embodiments, a default false alarm policy to be applied in response to an unexpected detection of the unique identifying characteristic associated with a particular siren device may be hard-coded on the siren devices or may programmed on the siren devices during initialization of the system or of the siren devices and may be modified as part of a subsequent reconfiguration the system or the siren devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for detecting a fault in a siren-based alert system, comprising:
   receiving, by a first siren device in a plurality of siren devices in the siren-based alert system from a central siren controller, a first activation command, wherein each of the plurality of siren devices is operable to generate an audible alert, wherein the first activation command includes an indication that a second siren device in the plurality of siren devices is to be activated by receipt of the first activation command, and wherein an audible alert from the second siren device includes a first unique identifying characteristic associated with the second siren device;
   determining, at the first siren device subsequent to receiving the first activation command from the central siren controller, that the first unique identifying characteristic associated with the second siren device is not detectable by the first siren device; and
   in response to determining that the first unique identifying characteristic associated with the second siren device is not detectable by the first siren device, taking corrective action in the siren-based alert system, wherein the corrective action includes the first siren device sending a first siren fault notification to the central siren controller indicating a failure to detect, at the first siren device, the first unique identifying characteristic associated with the second siren device.

2. The method of claim 1, wherein the first activation command comprises information identifying a subset of the plurality of siren devices to be activated by receipt of the first activation command, the subset including the second siren device.

3. The method of claim 2, wherein the first activation command further comprises information specifying a respective unique identifying characteristic associated with each of the siren devices in the identified subset of the plurality of siren devices to be activated by receipt of the first activation command, the information including the first unique identifying characteristic associated with the second siren device.

4. The method of claim 2, wherein:
   the identified subset of the plurality of siren devices to be activated by receipt of the first activation command further includes the first siren device; and
   the method further includes generating, at the first siren device, an audible alert including a second unique identifying characteristic associated with the first siren device.

5. The method of claim 1, wherein the corrective action further includes modifying an audible alert generated by the first siren device to compensate for a failure of the second siren device to generate an audible alert, the modifying including one or more of:
   changing a position, orientation, or panning motion of the first siren device; and
   increasing a volume of the audible alert generated by the first siren device.

6. The method of claim 1, further comprising storing, at the first siren device prior to receiving the first activation command, information identifying the second siren device as a siren device at a geographic distance from the first siren device in a range of geographic distances within which audible alerts generated by the second siren device are detectable by the first siren device.

7. The method of claim 1, further comprising:
   storing, at the first siren device prior to receiving the first activation command, information identifying the first siren device, the second siren device, and a third siren device as siren devices in a predefined subset of the plurality of siren devices in the siren-based alert system to be activated together as a siren activation group;
   detecting, at the first siren device subsequent to cancellation of the first activation command and absent receipt of a second activation command directed to the siren activation group, a second unique identifying characteristic associated with the third siren device; and
   performing, by the first siren device in response to detecting the second unique identifying characteristic associated with the third siren device, one or more of:
      sending a second siren fault notification to the central siren controller indicating that the second unique identifying characteristic associated with the third siren device was detected by the first siren device absent receipt of a second activation command directed to the siren activation group; and
      generating an audible alert including a third unique identifying characteristic associated with the first siren device.

8. The method of claim 1, wherein:
   the first siren device, the second siren device, and a third siren device are siren devices in a predefined subset of the plurality of siren devices in the siren-based alert system to be activated together as a siren activation group; and
   the method further comprises:
      detecting, at the third siren device subsequent to receiving the first activation command from the central siren controller, the first unique identifying characteristic associated with the second siren device; and
      determining, at the central siren controller in response to a failure to receive a siren fault notification from the third siren device indicating a failure to detect the first unique identifying characteristic associated with the second siren device in sounds audible by the third siren device, that further corrective action is unnecessary.

9. The method of claim 1, wherein:
   the plurality of siren devices in the siren-based alert system are to be activated by receipt of the first activation command;
   the first activation command is broadcast by the central siren controller one or more times; and
   the method further comprises, subsequent to broadcasting the first activation command a predetermined number of times, interrogating, by the central siren controller, each of the plurality of siren devices in turn to determine whether the siren device received the first activation command.

10. The method of claim 1, wherein the first unique identifying characteristic associated with the second siren device comprises data encoded in the audible alert from the second siren device, data transmitted using a sideband modulation of the audible alert from the second siren device, a pitch of the audible alert from the second siren device, or a period of the audible alert from the second siren device.

11. A siren device for a siren-based alert system, comprising:
  alert generation circuitry;
  a speaker configured to output audible alerts;
  an interface through which the siren device receives a first activation command from a central siren controller, wherein the first activation command includes an indication that a first additional siren device in the siren-based alert system is to be activated by receipt of the first activation command, and wherein an audible alert from the first additional siren device includes a first unique identifying characteristic associated with the first additional siren device;
  a microphone configured to receive audio signals;
  a local siren controller, comprising:
    a processor; and
    a memory storing program instructions that when executed by the processor cause the processor to perform:
      determining, subsequent to receiving the first activation command from the central siren controller, that the first unique identifying characteristic associated with the first additional siren device is not detectable in audio signals received by the microphone; and
      in response to determining that the first unique identifying characteristic associated with the first additional siren device is not detectable in audio signals received by the microphone, taking corrective action in the siren-based alert system, wherein taking the corrective action includes causing a first siren fault notification to be sent to the central siren controller via the interface indicating a failure to detect the first unique identifying characteristic associated with the first additional siren device.

12. The siren device of claim 11, wherein:
  the first activation command comprises:
    information identifying a collection of siren devices in the siren-based alert system to be activated by receipt of the first activation command, the identified collection including the first additional siren device; and
    information specifying a respective unique identifying characteristic associated with each of the siren devices in the identified collection of siren devices, the information including the first unique identifying characteristic associated with the first additional siren device; and
  when executed by the processor, the program instructions further cause the processor to perform storing the information identifying a collection of siren devices and the information specifying a respective unique identifying characteristic associated with each of the siren devices in the identified collection of siren devices in the memory.

13. The siren device of claim 12, wherein:
  the identified collection of siren devices further includes the siren device; and
  when executed by the processor, the program instructions further cause the processor to:
    initiate generation, by the alert generation circuitry, of an audible alert including a second unique identifying characteristic associated with the siren device; and
    cause the generated audible alert including the second unique identifying characteristic associated with the siren device to be output by the speaker.

14. The siren device of claim 11, wherein the corrective action further includes modifying an audible alert generated by the siren device to compensate for a failure of the first additional siren device to generate an audible alert, the modifying including one or more of:
  changing a position, orientation, or panning motion of the siren device; and
  increasing a volume of the audible alert generated by the siren device.

15. The siren device of claim 11, wherein when executed by the processor, the program instructions further cause the processor to perform:
  storing, at the siren device prior to receiving the first activation command, information identifying the siren device, the first additional siren device, and a second additional siren device as siren devices in a predefined subset of siren devices in the siren-based alert system to be activated together as a siren activation group;
  detecting, subsequent to cancellation of the first activation command and absent receipt of a second activation command directed to the siren activation group, a second unique identifying characteristic associated with the second additional siren device; and
  performing, in response to detecting the second unique identifying characteristic associated with the second additional siren device, one or more of:
    sending a second siren fault notification to the central siren controller indicating that the second unique identifying characteristic associated with the second additional siren device was detected by the siren device absent receipt of a second activation command directed to the siren activation group; and
    generating an audible alert including a third unique identifying characteristic associated with the siren device.

16. A siren-based alert system, comprising:
  a central siren controller; and
  a plurality of siren devices each operable to generate an audible alert, a first siren device of the plurality of siren devices comprising:
    an interface through which the first siren device receives a first activation command from the central siren controller, wherein the first activation command includes an indication that a second siren device of the plurality of siren devices is to be activated by receipt of the first activation command, and wherein an audible alert from the second siren device includes a first unique identifying characteristic associated with the second siren device;
    a microphone configured to receive audio signals;
    a local siren controller, comprising:
      a local processor; and
      a locally-accessible memory storing program instructions that when executed by the local processor cause the local processor to perform:
        determining, subsequent to receiving the first activation command from the central siren controller, that the first unique identifying characteristic associated with the second siren device is not detectable in audio signals received by the microphone; and
        in response to determining that the first unique identifying characteristic associated with the second siren device is not detectable in audio signals received by the microphone, taking corrective action in the siren-based alert system, wherein taking the corrective action includes causing a first siren fault notification to be sent to the central siren controller via the interface indicating a failure to detect the first unique identifying characteristic associated with the second siren device.

17. The siren-based alert system of claim 16, wherein:
the first activation command comprises information identifying a collection of siren devices in the siren-based alert system to be activated by receipt of the first activation command, the identified collection including the first siren device and the second siren device;
the first siren device further comprises:
   alert generation circuitry; and
   a speaker configured to output audible alerts; and
when executed by the local processor, the program instructions further cause the local processor to:
   initiate generation, by the alert generation circuitry, of an audible alert including a second unique identifying characteristic associated with the first siren device; and
   cause the generated audible alert including the second unique identifying characteristic associated with the first siren device to be output by the speaker.

18. The siren-based alert system of claim 16, wherein the corrective action further includes modifying an audible alert generated by the first siren device to compensate for a failure of the second siren device to generate an audible alert, the modifying including one or more of:
   changing a position, orientation, or panning motion of the first siren device; and
   increasing a volume of the audible alert generated by the first siren device.

19. The siren-based alert system of claim 16, wherein when executed by the local processor, the program instructions further cause the local processor to perform:
   storing, at the first siren device prior to receiving the first activation command, information identifying the first siren device, the second siren device, and a third siren device of the plurality of siren devices as siren devices in a predefined subset of siren devices in the siren-based alert system to be activated together as a siren activation group;
   detecting, subsequent to cancellation of the first activation command and absent receipt of a second activation command directed to the siren activation group, a second unique identifying characteristic associated with the third siren device; and
   sending, in response to detecting the second unique identifying characteristic associated with the third siren device, a second siren fault notification to the central siren controller indicating that the second unique identifying characteristic associated with the third siren device was detected by the first siren device absent receipt of a second activation command directed to the siren activation group.

20. The siren-based alert system of claim 19, wherein:
the central siren controller comprises:
   an interface through which the central siren controller broadcasts one or more activation commands including the first activation command to the plurality of siren devices, and receives the first siren fault notification and the second siren fault notification;
   a central processor; and
   a controller memory storing program instructions that when executed by the central processor cause the central processor to perform:
      receiving the second siren fault notification;
      determining whether an audible alert output by the third siren device represents a false alarm;
      broadcasting, in response to a determination that the audible alert output by the third siren device represents a false alarm, a cancellation command including an indication that the audible alert output by the third siren device is to be cancelled; and
      broadcasting, in response to a determination that the audible alert output by the third siren device does not represent a false alarm, a third activation command including an indication that the first siren device is to be activated by receipt of the third activation command;
when executed by the local processor, the program instructions stored in the locally-accessible memory of the first siren device further cause the local processor to:
   refrain from generating an audible alert in response to receiving the cancellation command; and
   generate an audible alert including a third unique identifying characteristic associated with the first siren device in response to receiving the third activation command.

* * * * *